United States Patent [19]
Zarchy et al.

[11] Patent Number: 5,376,164
[45] Date of Patent: Dec. 27, 1994

[54] PRESSURE SWING ADSORPTION PROCESS FOR CHLORINE PLANT OFFGAS

[75] Inventors: Andrew S. Zarchy, Amawalk; Chien C. Chao, Millwood; Richard T. Maurer, Nanuet, all of N.Y.

[73] Assignee: UOP, Des Plaines, Ill.

[21] Appl. No.: 103,368

[22] Filed: Aug. 9, 1993

[51] Int. Cl.$^5$ .............................................. B01D 53/04
[52] U.S. Cl. .......................................... 95/41; 95/96; 95/132; 95/902
[58] Field of Search ............... 95/39, 41, 96, 132, 95/900, 902

[56] References Cited

U.S. PATENT DOCUMENTS

| | | |
|---|---|---|
| 1,617,305 | 2/1927 | Guyer . |
| 1,660,642 | 2/1928 | Barnebey ............... 95/132 X |
| 2,340,398 | 2/1944 | MacMullin ............ 95/132 X |
| 2,800,197 | 6/1957 | Wynkoop . |
| 3,001,607 | 9/1961 | Eng et al. ............... 95/132 X |
| 3,029,575 | 4/1962 | Eng et al. ............... 95/132 |
| 3,063,218 | 11/1962 | Pernert et al. .......... 95/132 |
| 3,430,418 | 3/1969 | Wagner ..................... 55/25 |
| 3,522,007 | 7/1970 | Frevel et al. ............ 95/132 X |
| 3,564,816 | 2/1971 | Batta ......................... 55/26 |
| 3,792,571 | 2/1974 | Waki et al. .............. 95/132 X |
| 3,986,849 | 10/1976 | Fuderer et al. ........... 55/25 |
| 4,061,724 | 12/1977 | Grose et al. ............. 423/355 |
| 4,073,865 | 2/1978 | Flanigen et al. ......... 423/339 |
| 4,401,556 | 8/1983 | Bezman et al. ......... 208/111 |
| 4,474,587 | 10/1984 | Matsumoto et al. ..... 95/132 X |
| 4,869,803 | 9/1989 | Ward ......................... 208/46 |
| 5,198,001 | 3/1993 | Knebel et al. ........... 95/900 X |

FOREIGN PATENT DOCUMENTS

| | | |
|---|---|---|
| 226862 | 9/1985 | Germany . |
| 04362002A | 12/1992 | Japan . |
| 0952303 | 8/1982 | U.S.S.R. ................ 95/132 |
| WO91/08824 | 6/1991 | WIPO .................... 95/132 |

Primary Examiner—Robert Spitzer
Attorney, Agent, or Firm—Thomas K. McBride; John G. Tolomei; Richard P. Silverman

[57] ABSTRACT

A process is provided for the removal and recovery of chlorine from a chlorine plant offgas stream. A pressure swing adsorption (PSA) process is used to remove from the chlorine plant offgas a vent gas stream comprising hydrogen and a tail gas stream comprising chlorine which is subsequently liquefied. The PSA zone comprises at least 2 adsorption beds, wherein each of the adsorption beds comprises a first adsorption layer and at least a second adsorption layer. The first adsorption layer contains a weak adsorbent selective for the adsorption of chlorine and has a large pore structure with 12 member rings or more. The second adsorption layer contains a strong adsorbent selective for the adsorption of chlorine and has a small pore structure with 10 member rings, or less. The vent gas withdrawn from the process is essentially free of chlorine.

20 Claims, 3 Drawing Sheets

Figure 1

PRESSURE SWING ADSORPTION PROCESS FOR CHLORINE PLANT OFFGAS

FIELD OF THE INVENTION

This invention relates to a process for the removal of chlorine from a gas stream and, more particularly relates to the use of a pressure swing adsorption zone for the removal and recovery of chlorine from commercial chlorine plant or chlor-alkali plant offgas.

BACKGROUND OF THE INVENTION

Chlorine in residual amounts is usually present in the outlet or offgas streams following normal chlorine recovery operations. The need for a chlorine recovery system can occur in a number of ways, for instance, in caustic-chlorine plants wherein aqueous salt solutions are electrolyzed to produce chlorine and caustic soda, or plants wherein fused salt is electrolyzed to chlorine and sodium metal. In general, such plants include those in which a process is operated wherein a metallic halide undergoes electrolysis to produce free chlorine and/or other products. The necessity for special chlorine recovery arises from the fact that while approximately 95–96% of the chlorine can be liquefied and recovered in condensers, the remaining 4 to 5% passes out with the noncondensable gases. In most chlorine producing plants, this so-called "sniff gas" is neutralized with caustic, or further processed to recover chlorine.

Pressure swing adsorption (PSA) processes provide an efficient and economical means for separating a multicomponent gas stream containing at least two gases having different adsorption characteristics. The more strongly adsorbed gas can be an impurity which is removed from the less strongly adsorbed gas which is taken off as product, or, the more strongly adsorbed gas can be the desired product which is separated from the less strongly adsorbed gas. For example, it may be desired to remove carbon monoxide and light hydrocarbons from a hydrogen-containing feedstream to produce a purified (99+%) hydrogen stream for a hydrocracking or other catalytic process where these impurities could adversely affect the catalyst or the reaction. On the other hand, it may be desired to recover more strongly adsorbed gases, such as ethylene, from a feedstream to produce an ethylene-rich product.

In PSA processes, a multicomponent gas is typically passed to at least one of a plurality of adsorption zones at an elevated pressure effective to adsorb at least one component, i.e. the more strongly adsorbed components, while at least one other component passes through, i.e. the less strongly adsorbed components. At a defined time, the passing of feedstream to the adsorber is terminated and the adsorption zone is depressurized by one of more cocurrent depressurization steps wherein the pressure is reduced to a defined level which permits the separated, less strongly adsorbed component or components remaining in the adsorption zone to be drawn off without significant concentration of the more strongly adsorbed components. Then, the adsorption zone is depressurized by a countercurrent depressurization step wherein the pressure in the adsorption zone is further reduced by withdrawing desorbed gas countercurrently to the direction of the feedstream. Finally, the adsorption zone is purged and repressurized. Such PSA processing is disclosed in U.S. Pat. No. 3,430,418, issued to Wagner, U.S. Pat. No. 3,564,816, issued to Batta, and in U.S. Pat. No. 3,986,849, issued to Fuderer et al., wherein cycles based on the use of multibed systems are described in detail. As is generally known and described in these patents, the contents of which are incorporated herein by reference as if set out in full, the PSA process is generally carried out in a sequential processing cycle that includes each bed of the PSA system.

As noted above the more strongly adsorbed components, i.e., the adsorbates, are removed from the adsorber bed by countercurrently depressurizing the adsorber bed to a desorption pressure. In general, lower desorption pressures are preferred in order to provide more complete removal of the adsorbates during the desorption step.

The sniff gas, or chlorine plant offgas is composed principally of air, hydrogen and chlorine, the chlorine commonly being present in amounts up to approximately 60% by volume. The chlorine content of the sniff or residual gas can be separated by adsorption on various solid adsorbents, but some of these adsorbents present practical problems which limit their commercial value in combination with chlorine plants. Two solid adsorbents which have been considered are activated carbon and silica gel. Highly activated carbon is known to catalyze the reaction between hydrogen and chlorine to produce hydrochloric acid which is undesirable. Less active carbon has an extremely low adsorption capacity which results in large amounts of adsorbent.

A U.S. Pat. No. 1,617,305 to Guyer teaches that the thermal conductivity of silica gel is so low that for separating the gas mixtures containing high proportions of chlorine, the ratio of the adsorption period to the period required to desorb the chlorine from the silica gel is inordinately small. The process of Guyer subjects the gas mixture to treatment with silica gel in a series of adsorbers at superatmospheric pressure and desorbs the chlorine at a lower pressure while the temperature is maintained low enough to provide a useful margin in content of chlorine adsorbed on the silica gel. The pressure of the desorption step is maintained much lower than atmospheric pressure and the desorption temperature is maintained much lower than atmospheric temperature and preferably is refrigerated, i.e., not higher than about 10° C. throughout the adsorption and desorption cycle.

U.S. Pat. No. 2,800,197 to Wynkoop teaches a process for the recovery of chlorine from sniff gas wherein residual chlorine is recovered in a continuous manner from a two zone adsorption process with interzone cooling. The adsorption zones contain silica gel. At least a portion of the recovered chlorine-free gas stream is employed to strip the final traces of adsorbed chlorine during the regeneration cycle.

One more recent example of a process which uses adsorption to recover chlorine is a Japanese publication, JP 04362002-A, which discloses a process for the recovery of liquid chlorine from a gas mixture. The process includes the steps of compressing and condensing of the mixture to provide a liquid chlorine stream and a non-condensing gas. The non-condensing gas is further processed in an adsorption tower to produce a vent gas stream containing up to 1 vol-% chlorine. Upon desorption at lower pressure, the desorbed gas comprising adsorbed chlorine is returned to the compression step.

In a typical chlor-alkali plant, a chlorine plant offgas stream is produced which contains up to 60 volume percent chlorine. Conventional technology which generally comprises multistage offgas compression, cooling, and partial condensation is followed by an absorption and stripping process which uses a carbon tetrachloride solution to produce a vent gas stream containing about 1 vol % chlorine. One example of a process which uses the toxic solvent carbon tetrachloride is disclosed in German Patent DD-226862-B, wherein a chlorine containing gas mixture is contacted with a solvent in an absorber, formed as a bubble column which has been cooled to a temperature to between $-20°$ to $-25°$ C. The solvent is a mixture of chlorohydrocarbons containing 60-80% carbon tetrachloride. The solvent is subsequently desorbed to provide a desorbed gaseous chlorine. Some traces of the carbon tetrachloride are entrained in the desorbed gaseous chlorine. The vent gas from the absorption and stripping process is further followed by a caustic scrubbing step to neutralize and remove any remaining chlorine in the plant offgas stream. This caustic scrubbing step produces a liquid stream containing chlorine which must be disposed or sold as a low value laundry bleach.

Processes for the remediation of chlorine plant offgas are sought which eliminate the use of potentially toxic solvents.

Processes for the remediation of chlorine plant offgas are sought which complement and preferably replace existing solvent absorption and stripping processes.

Processes for the remediation of chlorine plant offgas are sought which can reduce the chlorine content in the remediated gas, or vent gas to a level below 10 ppm-vol. Furthermore, processes are sought which eliminate the need for the caustic scrubbing step by reducing the chlorine content in the vent gas to less than 1 ppm-wt chlorine.

Processes are sought which reduce the adsorbent inventory by permitting the adsorption and regeneration to take place rapidly.

SUMMARY OF THE INVENTION

By the present invention, a PSA process is provided for recovering a liquid chlorine product and chlorine plant offgas remediation that can yield a vent stream essentially free of chlorine. The process employs a selective adsorbent and a diluent that can effectively control the concentration of the streams produced yielding a higher recovery of chlorine than traditional methods without the use of toxic solvents. Furthermore, the process produces a vent gas stream which is substantially free of chlorine and thus avoids the production of an aqueous waste stream.

In a broad aspect of the present invention there is provided a pressure swing adsorption process for the recovery and removal of chlorine from a chlorine plant offgas stream comprising hydrogen, air, and chlorine. The process includes the steps of passing the chlorine plant offgas stream at adsorption conditions including an adsorption temperature and an adsorption pressure to a pressure swing adsorption zone. The pressure swing adsorption zone comprises a first adsorption bed of at least two adsorption beds. Each of the adsorption beds has a first adsorbent layer comprising a weak adsorbent selective for the adsorption of chlorine and a second adsorbent layer comprising a strong adsorbent selective for the adsorption of chlorine. The pressure swing adsorption zone provides a vent gas stream, withdrawn at a pressure substantially equal to the adsorption pressure, and a tail gas stream, withdrawn at a desorption pressure. The vent gas stream is substantially free of chlorine and comprises hydrogen. The tail gas stream comprises chlorine. The tail gas stream is compressed to provide a compressed tail gas stream and the compressed tail gas stream is condensed to provide a liquefied chlorine product and a reduced chlorine offgas stream.

In another embodiment, the present invention provides a pressure swing adsorption process for the recovery and removal of chlorine from a chlorine plant offgas stream comprising hydrogen, air, and chlorine. The process includes the steps of passing the chlorine plant offgas stream at a chlorine plant pressure to a first compressor to raise the pressure of the chlorine plant offgas stream to a first condensation pressure to provide a compressed chlorine plant offgas stream. The compressed chlorine plant offgas stream is cooled and condensed to provide a first liquid chlorine product stream and a first reduced chlorine offgas stream having a concentration of chlorine which is lower than that of the chlorine plant offgas stream. The first reduced chlorine offgas is passed to a pressure swing adsorption zone at adsorption conditions including an adsorption pressure. The pressure swing adsorption zone comprises a first adsorption bed of at least two adsorption beds. Each of the adsorption beds has a first adsorbent layer containing a weak adsorbent selective for the adsorption of chlorine and a second adsorbent layer containing a strong adsorbent selective for the adsorption of chlorine. The pressure swing adsorption zone provides a vent gas stream comprising hydrogen and a tail gas stream comprising chlorine. The tail gas stream is compressed, cooled, and condensed to provide a second liquid chlorine product stream and a second reduced chlorine offgas stream. The second reduced chlorine offgas stream is passed to said pressure swing adsorption zone to be admixed with the chlorine plant offgas stream.

DETAILED DESCRIPTION OF THE INVENTION

The invention is useful for the remediation of the chlorine plant offgas to provide a vent stream essentially free of chlorine, where essentially free means a concentration of chlorine which is less than 10 ppm, and preferably where the concentration of chlorine in the vent stream is between about 0.1 and about 10 ppm vol. chlorine. The chlorine removed from the chlorine plant offgas is recovered as a liquid product which can be returned to the chlorine plant.

Explosions can be caused by the reaction of hydrogen with chlorine or with oxygen. When hydrogen is present in a gas stream with chlorine or oxygen at hydrogen concentration less than about 4 vol-%, usually the stream is non-explosive and can be made to react only with difficulty. However, as the hydrogen concentration increases above this lower explosive limit, which ranges from 3% to 8% hydrogen depending upon the temperature and pressure, the reaction on ignition becomes more violent and eventually may reach the detonation stage. When process schemes are employed which include the step of condensing or partially condensing a gas stream and a portion of the liquefied reactive halogen, such as chlorine or oxygen, is removed, the non-condensed portion of the gas stream becomes enriched in hydrogen and rapidly attains a potentially explosive composition. An article by William C. Eichelberger et al. entitled, "Explosions and Detonations in Chlorine Production" which appeared in *Chemical Engineering Progress,* August 1961, volume 57, no. 8, pp 94–96, discloses the lower explosive limits for hydrogen in chlorine. It is, therefore, critical to maintain the non-condensed portion of a gas stream following the liquefaction of the reactive halogen below this explosive limit by the blanketing or dilution of the process with air or nitrogen to maintain the hydrogen concentration within the process below the explosive limits.

The pressure swing adsorption process is an essentially adiabatic process for separating a multicomponent fluid containing at least one selectively adsorbable component. The PSA process of the invention relates to conventional PSA processing in which each bed of an adsorption zone undergoes, on a cyclic basis, high pressure adsorption, optional cocurrent depressurization to intermediate pressure level(s) with release of void space gas from the product end of the bed, countercurrent depressurization to lower desorption pressure with the release of desorbed gas from the feed end of the adsorbent bed, with or without purge of the bed, and repressurization to higher adsorption pressure. The adsorption zone is countercurrently depressurized to a desorption pressure that is near, at, or below atmospheric pressure with the more adsorbable component(s) comprising chlorine being discharged from the feed end thereof. In the multi-bed adsorption systems to which the invention is directed, the displacement gas used for each bed is obtained by diverting a portion of the gas released from that or another bed in the system during the countercurrent depressurization steps, following recompression or obtained from an external stream which comprises chlorine. It is preferred that the displacement gas be a portion of the vent gas or the gas released from that or another bed in the system during the cocurrent depressurization step in the process.

Those skilled in the art will appreciate that the high-pressure adsorption step of the PSA process comprises introducing the feedstream to the feed end of the adsorbent bed at a high adsorption pressure. The less readily adsorbable component(s) or hydrogen passes through the bed and is discharged from the product end thereof. An adsorption front or fronts are established in the bed with said fronts likewise moving through the bed from the feed end toward the product end thereof. When the feedstream contains a less readily adsorbable component and a more readily adsorbable component, a leading adsorption front of the more readily adsorbable component will be established and move through the bed in the direction of the product or discharge end thereof.

The chlorine plant offgas stream, or feedstream, of this invention comprises from about 10 to about 60 mol-% chlorine, from about 1 to 4 mol % hydrogen, and from about 10 to 60 mol % air. The chlorine plant offgas stream is charged to an adsorption zone to recover chlorine. In the adsorption zone, the more readily adsorbable component, chlorine, is adsorbed at an adsorption zone pressure and adsorption zone temperature, and the less readily adsorbable components are passed through the adsorption zone. The adsorption zone pressure ranges from about 345 kPa to about 4.1 MPa (about 50 to about 600 psia). The adsorption zone temperature is any temperature effective to adsorb the more readily adsorbable components in the feedstream, and preferably from about $-40°$ C. to about $40°$ C. (about $-40°$ to about $100°$ F.). It is to be understood that the adsorption zones of the present invention contain adsorption beds containing adsorbent suitable for adsorbing the particular components to be adsorbed therein. As the capacity of the adsorber bed for the more readily adsorbable component is reached, that is, preferably before a substantial portion of the leading adsorption front has passed through the first adsorption bed, the feedstream is directed to another bed in the adsorption zone. It is to be also understood that the term "countercurrent" denotes that the direction of gas flow through the adsorption bed, is countercurrent with respect to the direction of feedstream flow. Similarly, the term "cocurrent" denotes flow in the same direction as the feedstream flow. The purge gas is at least partially comprised of an effluent stream, e.g., the adsorption effluent stream or the cocurrent displacement effluent stream, from the adsorption bed, as hereinafter described, which comprises the less readily adsorbable component. When hydrogen and air are the less readily adsorbable components, the purge gas is preferably rich in hydrogen and air at a higher concentration than available in the feedstream. The term "enriched" is intended to be with reference to the feedstream composition unless otherwise noted.

The adsorption bed is desorbed by reducing the pressure in a direction countercurrent to the feeding direction to a desorption pressure that is preferably from about atmospheric pressure to about 345 kPa (about 50 psia), and preferably, the desorption pressure will range between about 100 kPa (15 psia) and about 210 kPa (30 psia).

It will further be understood that various changes and modifications can be made in the details of the PSA process with intermediate product recovery as herein described and illustrated above without departing from the scope of the invention as set forth in the appended claims. Thus, in addition to varying the number of beds employed, the number of cocurrent depressurization-pressure equalization steps employed, whether or not such pressure equalizations are direct or indirect through an external storage vessel, may all be varied depending upon the circumstances and results desired in any given application. In the equalization step, the adsorption bed is partially repressurized by introducing an equalization gas until the pressure of the adsorption zone is approximately equal to the equalization pressure. In the process of this invention, the cocurrently depressurizing step can comprise two or more pressure equalization steps. Accordingly, the individual steps described, as well as conventional variations thereof are generally known by those skilled in the art and need not be further described herein. It will be further understood that PSA systems necessarily incorporate various conduits, valves, and other control features to accomplish the necessary switching of adsorbent beds from one step to the next, in appropriate sequence as in conventional PSA operations.

It will also be understood that the invention can be carried out using any suitable adsorbent material in the adsorption bed having a selectivity for various components of a feedstream over other such components, thereby providing a less readily adsorbable component and a more readily adsorbable component. In the present invention, the more readily adsorbable component is chlorine and the less readily components are hydrogen and air. Any adsorbent which is selective for the adsorption of chlorine may be used in the adsorption beds of the PSA zone. Suitable adsorbents known in the art and commercially available include crystalline molecular sieves, activated carbons, activated clays, silica gels, activated aluminas and the like. The molecular sieves include zeolitic molecular sieves.

Zeolitic molecular sieves in the calcined form may be represented by the general formula;

$Me_{2/n}O:Al_2O_3:xSiO_2$ where Me is a cation, x has a value from about 2 to infinity, and n is the cation valence. Typical well-known zeolites which may be used include, chabazite, also referred to as Zeolite D, clinoptilolite, chabazite, erionite, faujasite, also referred to as Zeolite X and Zeolite Y, ferrierite, mordenite, Zeolite A, Zeolite Omega, Zeolite rho, Zeolite Beta, Boggsite, and silicalite. It is desirable to reduce the aluminum content in the zeolite structure, thereby reducing the affinity of chlorine to the zeolite, and further to prevent the formation of $AlCl_3$ which is an undesirable side reaction. For these reasons, zeolites suitable for use according to the present invention are those having a high silica content, i.e., those having silica to alumina ratios preferably greater than 10 and more preferably greater than 30. One such high silica zeolite is silicalite, as the term used herein includes both the silicapolymorph disclosed in U.S. Pat. No. 4,061,724 and also the F-silicalite disclosed in U.S. Pat. No. 4,073,865, hereby incorporated by reference. Detailed descriptions of some of the above identified zeolites may be found in D. W. Breck, *ZEOLITE MOLECULAR SIEVES*, John Wiley and Sons, New York, 1974, hereby incorporated by reference. In selecting an adsorbent, it is important to note that chlorine is strongly adsorbed by cations on the adsorbent. Therefore, zeolites with high silica content and which are proton exchanged are preferred in adsorbent bed regions of high chlorine concentration, so that subsequent desorption of the chlorine does not become impractical. By proton exchanged, it is meant that the cation such as alkaline metals and organic cations normally on the zeolite structure are replaced with a proton. However, with some zeolite structures, chlorine will interact strongly with the channel wall of the adsorbent. For these reasons it is preferred to use a weak adsorbent such as a zeolite with a large cage structure separating high concentrations of chlorine from air; and, it is preferred to use strong adsorbents such as zeolites with small cage structures (i.e., a small pore structure having a one dimensional pore or 10 member rings or less) to remove low concentrations of chlorine from air. Zeolites with large pore structures (12 member rings or more) with relatively weak adsorption include: Faujasite, also referred to as Zeolite X, Zeolite Y, Zeolite LZ-10, Zeolite LZ-15, Zeolite LZ-20, Zeolite Beta, Boggsite, hexagonal Faujasite, and the like. Zeolite structures with relatively strong adsorption affinity for chlorine include Zeolite L, Mordenite, Zeolite Omega, ZSM-5, ZSM-11, ZSM-12, ZSM-18, ferrierite, clinoptilolite, chabazite, erionite, Zeolite A, Zeolite-rho, and silicalite.

Adsorbents suitable for the adsorption of chlorine in the process of the present invention may comprise Zeolite Y or various modifications of Zeolite Y in a refractory inorganic oxide matrix. Zeolite Y can be modified for example by increasing the molar ratio of silica to alumina. U.S. Pat. No. 4,869,803 describes an improved method of calcining zeolites. This patent presents characterizations of Y-82, LZ-10 and LZ-20 zeolites in columns 7-8 and is incorporated herein by reference for its teaching regarding the preparation, characterization and distinguishing features of each of these materials. This reference refers to the U.S. Pat. No. 4,401,556 issued to R. D. Bezman and J. A. Rabo disclosing an ultrahydrophic Zeolite Y (UHP-Y) characterized by having a silica to alumina molar ratio of from 4.5 to 35, the essential X-ray powder diffraction pattern of zeolite Y, an ion exchange capacity of not greater than 0.070, a unit cell dimension of from 24.20 to 24.45 Angstroms, a surface area of at least 350 $m^2/g$ (B-E-T), a sorptive capacity for water vapor at 25° of from 2 to 4 weight percent at a $p/p°$ value of 0.10, and a Residual Butanol Test value of not more than 0.40 weight percent. This reference has been referred to in the art as describing the preparation of the zeolite sold under the LZ-10 trademark. LZ-20 is prepared in a similar manner to LZ-10, except that the final calcination takes place in a single step. Zeolite LZ-15 is prepared in a similar manner as zeolite LZ-20, but LZ-15 has a lower water capacity than zeolite LZ-20. The specifications for LZ-20 are a $SiO_2/Al_2O_3$ ratio of 5.0 to 6.0, a surface area of from 580 to 650 $m^2/g$ (B-E-T), a unit cell dimension of from 24.33 to 24.41 Angstroms, and a sorptive capacity for water vapor of from 3.0 to 5.5 pounds of water per 100 pounds of adsorbent. Zeolites LZ-10, LZ-20, and LZ-15 are available from UOP in Des Plaines, Ill.

More preferably the weak adsorbent of the present invention is selected for the group consisting of silica gel, zeolite LZ-10, zeolite LZ-15, zeolite LZ-20, and mixtures thereof. More preferably, the strong adsorbent is selected from the group consisting of silicalite, acid washed clinoptilolite, ammonia clinoptilolite, and mixtures thereof.

It is often desirable when using crystalline molecular sieves that the molecular sieve be agglomerated with a binder in order to ensure that the adsorbent will have suitable particle size. Although there are a variety of synthetic and naturally occurring binder materials available such as metal oxides, clays, silicas, aluminas, silica-aluminas, silica-zirconias, silica-thorias, silica-berylias, silica-titanias, silica-alumina-thorias, silica-alumina-zirconias, mixtures of these and the like, silica binders are preferred. Silica is preferred because it may be employed to agglomerate the molecular sieve without substantially altering the adsorptive properties of the zeolite. The choice of a suitable binder and methods employed to agglomerate the molecular sieves are generally known to those skilled in the art and need not be further described herein.

The PSA process operates most efficiently when the adsorption pressure, the pressure at which the adsorption step takes place, is preferably in the range of about 345 kPa to about 4.1 MPa (about 50 to about 600 psia). The desorption pressure, the pressure at which the desorption effluent is recovered, is preferably in the range of about 100 kPa (about 15 psia) to about 210 kPa (about 30 psia).

Following the adsorption step, the adsorption bed is cocurrently depressurized. This cocurrently depressurizing step is known in the art as a pressure equalization step which reduces the pressure of the adsorption bed to an equalization pressure of from about 517 to about 1724 kPa (about 75 to about 250 psia). Although only one pressure equalization step is exemplified herein, two or more pressure equalization steps to intermediate pressure level(s) may be employed to approach the equalization pressure at the conclusion of the final equalization step. A further cocurrently depressurizing step is used to provide a purge gas for another adsorption bed and reduce the process to a start of blow-down pressure, ranging from about 170 to about 700 kPa (about 25 to about 100 psia).

The cocurrent depressurization step is followed by a countercurrent depressurization step to reduce the pressure to the desorption pressure and to recover a desorption effluent stream, or tail gas stream, comprising chlorine. The adsorption bed is optionally countercurrently purged with the purge gas stream from another adsorption bed undergoing a further cocurrent depressurizing step, and a countercurrent purge effluent stream comprising chlorine is recovered. The adsorption bed is repressurized by passing a portion of a cocurrent depressurizing effluent from another adsorption bed to equalize the pressure therebetween, and further repressurized by countercurrently passing a portion of the vent gas stream to the adsorption bed. The adsorption bed can also be repressurized with a portion of the chlorine plant offgas stream.

Figure 1:
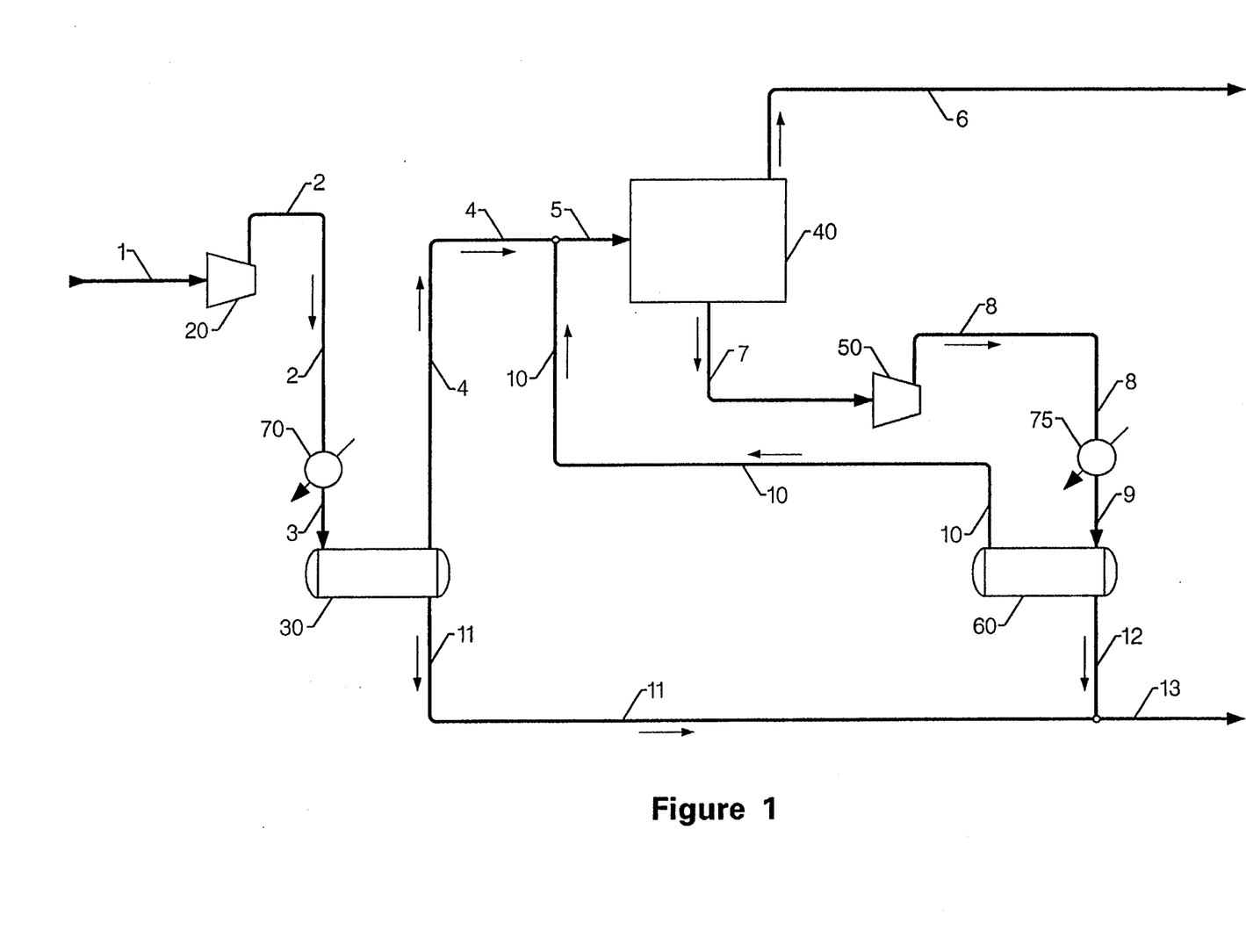
FIG. 1 is a schematic flow sheet of the process of the invention.

The process of this invention is illustrated in FIG. 1. FIG. 1 is a schematic flow sheet of a system for remediation of a chlorine offgas stream and the recovery of a liquid chlorine product according to the instant invention. With reference to FIG. 1, a chlorine offgas stream via line 1 at a chlorine plant pressure of from about 210 to about 450 kPa (about 30 to 65 psia) and a temperature of about 0° C. (32° F.) is passed to a first compressor 20 to provide a compressed chlorine plant offgas stream 2 at a first condensation pressure. The first condensation pressure varies somewhat with the composition of the chlorine plant offgas stream, but is preferably in the range of about 345 kPa to about 4.1 MPa (about 50 psia to about 600 psia). The compressed chlorine plant offgas stream is passed via line 2 to a first cooler 70 which lowers the temperature of the compressed chlorine plant offgas stream to provide a first cooled offgas stream in line 3 having a temperature effective to condense and liquefy at least a portion of the chlorine, and the cooled offgas stream is passed to a first separator 30. From the first separator two streams are withdrawn: a first liquid chlorine product stream 11 and a first reduced chlorine offgas stream 4. The first reduced chlorine offgas stream comprises hydrogen and has a concentration of chlorine ranging from about 5 to 45 vol-%, which is lower than the chlorine plant offgas stream. The first reduced chlorine offgas stream is passed to a pressure swing adsorption zone 40 via lines 4 and 5.

The pressure swing adsorption (PSA) zone comprises a first adsorption bed of at least two adsorption beds (not shown). Each of the adsorption beds has a feed and an effluent end and each contains at least two adsorption layers of an adsorbent selective for the adsorption of chlorine. In a first adsorption layer, there is contained a weak adsorbent for the selective adsorption of chlorine. The second adsorption layer contains a strong adsorbent selective for the adsorption of chlorine. During the process, the chlorine plant offgas stream having an initial concentration of chlorine is passed to the first adsorption bed containing the first adsorption layer wherein a portion of the chlorine is adsorbed by the weak adsorbent to provide an intermediate vent gas which has a first reduced concentration of chlorine. The intermediate vent gas is passed to the second adsorption layer within the adsorption bed. The second adsorption layer contains the strong adsorbent, wherein the concentration of chlorine is further reduced by adsorption therein to provide a vent gas product stream having a low concentration of chlorine. It is believed that if the adsorption bed contained only the weak adsorbent, the concentration of the chlorine in the vent gas would not be sufficiently reduced. If the entire adsorption zone contained only a single layer comprising the strong adsorbent, the strong adsorbent could not be purged easily or economically of the chlorine. Thus, the combination of the weak adsorbent to reduce the chlorine concentration in the chlorine plant offgas stream to a diluted or intermediate level, followed by the further adsorption in at least a second adsorption layer comprising a strong adsorbent selective for the adsorption of chlorine to reduce the chlorine concentration to a low concentration results in a novel process which achieves higher chlorine recoveries and lower chlorine releases in the vent gas stream. It is important to provide a sufficient amount of weak adsorbent in the first adsorption layer to contain the chlorine equilibrium, or mass transfer zone within the weak adsorbent layer such that the concentration of chlorine entering the second adsorption layer containing the strong adsorbent remains at a concentration of chlorine which can be removed at the desorption conditions of the PSA process. Preferably, the intermediate concentration of chlorine leaving the first adsorption layer and entering the second adsorption layer will have a partial pressure of chlorine less than about 300 torr, and most preferably the partial pressure of the chlorine between the first adsorption layer and the second adsorption layer will be less than 100 torr. Stating these chlorine partial pressures in terms of the gas phase concentration of chlorine in the void space of the adsorption beds over the typical range of PSA adsorption zone pressure, preferably the intermediate concentration of chlorine will be less than 10 vol-%, and most preferably the intermediate concentration of the chlorine will be less than about 2 vol-%. Preferably, the first adsorption layer containing the weak adsorbent will comprise up to 95% of each of the adsorbent beds. More preferably, the second adsorption layer containing the strong adsorbent will comprise from about 5 to about 25 percent of each of the adsorbent beds.

The PSA zone provides a vent gas stream 6 comprising hydrogen and a tail gas stream 7, comprising chlorine. The vent gas stream is withdrawn as a remediated chlorine plant offgas. Preferably the remediated chlorine plant offgas or vent gas will contain less than about 10 ppm-vol of chlorine, and more preferably the vent gas will contain between about 0.1 ppm-vol to about 10 ppm-vol chlorine and less than about 4 vol-% hydrogen. Although not shown in the drawing, the vent gas may be diluted with air or nitrogen as necessary to prevent the formation of an explosive mixture. It was unexpectedly discovered that the replacement of at least a portion of the weak adsorbent with a second adsorption layer comprising a strong adsorbent selective for the adsorption of chlorine resulted in an increased rejection of the diluent, or at least a portion of the diluent, with the vent gas.

The tail gas stream 7 withdrawn from the PSA zone at a desorption pressure ranging from about 100 kPa to about 210 kPa (about 15 psia to about 30 psia) is passed to a second compressor 50 to increase the pressure of the tail gas stream to a second condensation pressure ranging from about 345 kPa to about 4.1 MPa (about 50 psia to about 600 psia). The compressed tail gas stream is passed via line 8 to a second cooler 75 to reduce the temperature of the compressed tail gas stream to temperature ranging from about $-40°$ C. to about $10°$ C. (about $-40°$ F. to about $50°$ F.) which is effective to condense at least a portion of the chlorine in the cooled compressed tail gas stream. The cooled compressed tail gas stream is passed to a second separator 60 to provide a second liquid chlorine product stream 12 and a second reduced chlorine offgas stream. At least a portion of the second reduced chlorine offgas stream is passed via line 10 as a recycle stream to be admixed with the feedstream to the PSA zone to recover additional chlorine. The second liquid chlorine stream 12 and the first liquid chlorine stream in line 11 may be combined in line 13 and recovered as a combined liquid chlorine product.

The following examples are provided to illustrate the present invention and are not intended to limit the scope of the claims that follow.

EXAMPLES

Example I—Adsorbents

Chlorine adsorption screening tests were conducted in a McBain Bakker Balance. A detailed description of this balance in general can be found in text books such as "Physical Adsorption of Gases" by D. M. Young and A. D. Crowell, Butterworths, 1962. The system used is completely made of glass. It consists of a manifold and 16 hangdown tubes. Each tube has a quartz spring and at the end of each spring, there was a quartz bucket for holding the adsorbents. The weight gain due to adsorption was manifested as an extension of the length of the spring. The manifold is connected to an all glass diffusion pump, and in turn to a mechanical forepump. To prepare the adsorbent for adsorption, vacuum activation was carried out at an elevated temperature. The hangdown tube was heated in a fiber glass heating mantle. The temperature of activation was controlled and monitored. A temperature of about $150°$ C. was used to activate silica gel, and a temperature of about $400°$ C. was used to activate the zeolites. The activation was considered complete after the pressure of the system was dropped to $10^{-5}$ torr. (generally, about 16 hours). After activation, the samples were cooled to room temperature, and chlorine gas was introduced to the system. The pressure of $Cl_2$ was monitored by a mercury manometer. The mercury was protected from chlorine by a one inch layer of silicon oil. The spring extension or the weight gain was monitored by a cathotometer. The introduction of chlorine gas was continued until the adsorbent had reached equilibrium and the weight gain of the adsorbent had stopped. Typically, the samples reached equilibrium within about 2 hours. Chlorine isotherms were measured at 8, 50, 150, 300 and 650 torr. Chlorine loadings on the adsorbent samples were reported as weight percent. The adsorbents screened were (a) acid leached Mordenite, (b) LZ-10, (c) LZ-20, (d) silicalite, (e) acid leached clinoptilolite, (f) ammonia-exchanged mordenite, (g) silica gel and (h) ammonia-exchanged clinoptilolite which had been acid washed.

The acid leached mordenite was a mordenite which had been steamed and acid washed to increase the silica to alumina (Si/Al$_2$) ratio to about 48. Hydrochloric acid in concentrations ranging from 1N to 6N was used for acid leaching the adsorbent. It was found that for chlorine adsorption that an adsorbent which had been steamed followed by acid leaching provided better adsorbents. These better adsorbents were characterized by a lower aluminum content which resulted in a reduced affinity for the chlorine cation and the reduced formation of AlCl$_3$. The reduction in the aluminum content in the zeolite framework can be carried out by steaming, acid leaching or leaching by a complexing agent. It was found that steaming is an effective way of removing the aluminum from the framework and repairing the damage; however, some aluminum was left outside the zeolite framework. If this extra aluminum is not removed, it will react with the chlorine to form the Al$^{3+}$ which is undesirable. Steaming the adsorbent following acid leaching was found to be effective in removing the extra framework aluminum.

Figure 2:
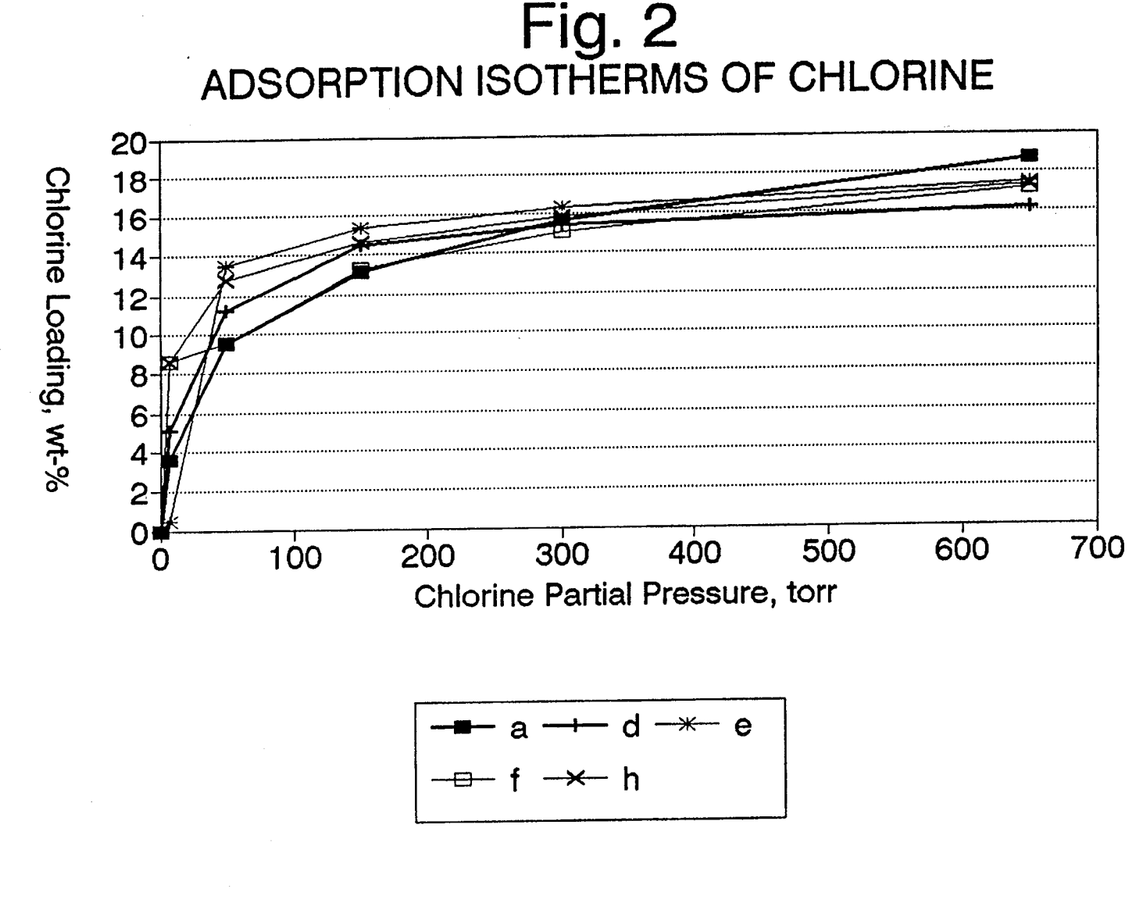
FIG. 2 is a graph showing adsorption isotherms for strong adsorbents of chlorine.

FIG. 2 presents the adsorption isotherms as measured in chlorine loadings in weight percent as a function of the chlorine partial pressure in torr for the adsorbents having relatively strong adsorption for chlorine. The adsorbents exhibiting strong adsorption for chlorine included (a) acid leached mordenite, (d) silicalite, (e) acid leached clinoptilolite, (f) ammonia-exchanged mordenite, and (h) ammonia-exchanged clinoptilolite which had been acid washed. This group of adsorbents showed particularly strong chlorine adsorption at lower pressures. Thus, according to the isotherm shown in FIG. 2, the differential loading of chlorine on this group of adsorbents would be largest in a PSA process wherein the adsorption step takes place at a chlorine partial pressure less than 300 torr and the desorption step takes place at a chlorine partial pressure less than 100 torr, and even greater when the desorption pressure takes place at a chlorine partial pressure less than 50 torr.

Figure 3:
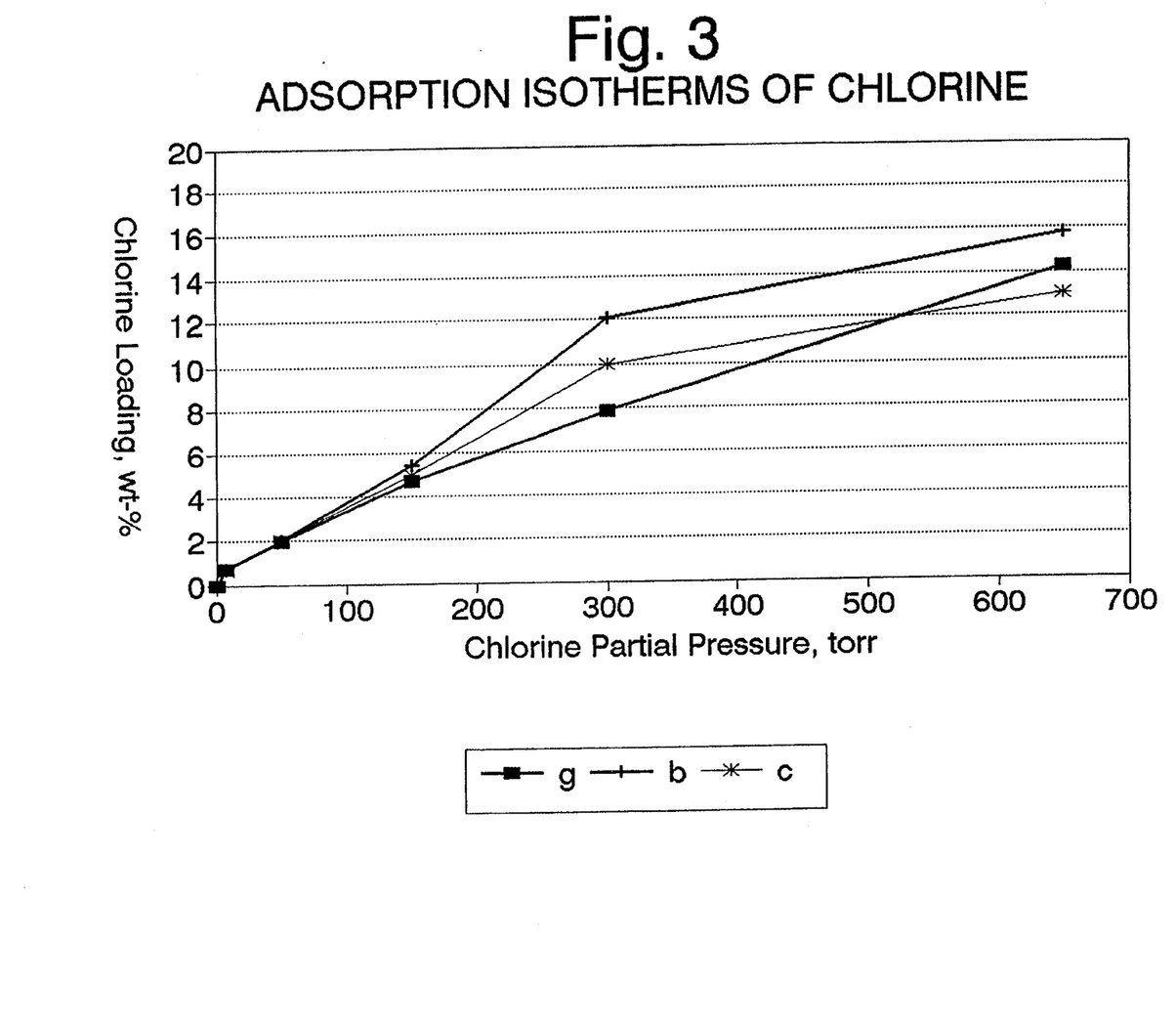
FIG. 3 is a graph showing adsorption isotherms for weak adsorbents of chlorine.

FIG. 3 presents adsorption isotherms for (g) silica gel, (b) Zeolite LZ-10, and (c) Zeolite LZ-20. The isotherms for these materials were more linear than the isotherms shown in FIG. 2 indicating a weaker affinity for chlorine. Test data were developed for the silica gel over the above mentioned range of pressures. According to the results shown in FIG. 3, the differential loading of chlorine on the adsorbents LZ-10, LZ-20, and silica gel would be similar for a PSA process wherein the adsorption step takes place at a chlorine partial pressure in the gas phase having a range above 400 torr and having a desorption step occurring at a chlorine partial pressure of below 100 torr. Although there was some unexpected deviation from the linear trend observed at 300 torr for the LZ-10 and LZ-20 isotherms, we believe that this deviation may be a result of a minor experimental error. Nevertheless, the validity of these data points will not affect the utility of the adsorbents, particularly when the desorption pressure is lower than 300 torr.

Thus a PSA process for the removal of chlorine from a chlorine containing sniff gas could be carried out in a PSA process which employs an adsorbent selected from the adsorbents shown in FIG. 3 in a first adsorption zone wherein the partial pressure of chlorine is reduced below 300 torr, and preferably below 100 torr. The gas phase exiting the first adsorption zone can then be passed to a second adsorption zone containing adsorbents selected from the adsorbent depicted in FIG. 2. In the second zone the adsorption of chlorine can continue to very low levels.

Example II—PSA Process

In Example II, an engineering simulation of the operation of a PSA zone for the remediation of a chlorine plant offgas, of sniff gas, was developed. The sniff gas was passed to the first adsorbent bed of a two PSA bed system, wherein each adsorbent bed contained an adsorbent selective for the adsorption of chlorine. The temperature of the adsorbent bed was 7° C., the pressure at which the adsorption took place was 760 kPa (110 psia), and the pressure at which the adsorption beds underwent desorption was 170 kPa (25 psia). The adsorbent volume per vessel was approximately 0.014 cubic meters (0.51 cubic feet). The 2-bed PSA cycle comprised a 4 minute adsorption time and an equivalent length desorption time. Cases were developed to show the operation of the present invention with a sniff gas having a chlorine level of 60 mole percent and a sniff gas having a chlorine level of 30 mole percent. The diluent gas used was nitrogen. The adsorbent beds were filled with either a silica gel, a weak adsorbent selective for the adsorption of chlorine, or filled with a first layer of silica gel and a second layer of silicalite, a strong adsorbent selective for the adsorption of chlorine.

The following table summarizes the results of the evaluation.

| CASE: | A | B | C | D | E | F | G | H |
|---|---|---|---|---|---|---|---|---|
| Sniff gas Cl$_2$, mole-% Rel. Bed Length, vol-% | 60 | 60 | 60 | 30 | 30 | 30 | 30 | 30 |
| Silica Gel | 100 | 95 | 75 | 100 | 95 | 75 | 100 | 75 |
| Silicalite | | 5 | 25 | | 5 | 25 | | 25 |
| Total Feed Rate, Nm3/hr | 2.68 | 2.72 | 3.18 | 4.24 | 4.32 | 5.24 | 2.73 | 3.61 |
| Vent Gas Cl$_2$, mole-% | 1.8 | 1.8 | 1.8 | 1.8 | 1.8 | 1.8 | 0.2 | 0.2 |
| Nitrogen Rejection to Vent Gas, % of feed | 14 | 16 | 28 | 40 | 41 | 52 | 7 | 30 |

Cases A, B, and C were based on a feed sniff gas containing 60 mole-% chlorine and were directed to producing a vent gas which contained 1.8 mole % chlorine, or had a chlorine partial pressure of 100 torr in the adsorption step of the PSA process. When 5 percent of the silica gel bed of Case A was replaced with a strong adsorbent, silicalite in Case B, it was possible to increase the feed rate by about 2.5 percent, with a corresponding 14 percent increase in the rejection of the diluent to the vent gas. This increase in the rejection of the diluent, nitrogen, results in a reduction of the recycle in the process of the present invention. In Case C, 25 percent of the silica gel was replaced with silicalite as a second adsorption layer in the adsorption beds. Comparing Case A to Case C, Case C showed an 18 percent increase in feed capacity and a two-fold increase in the rejection of the diluent to the vent gas.

Cases D, E, and F were based on a sniff gas containing 30 percent chlorine and the balance nitrogen, and were directed to producing a vent gas which contained 1.8 mole-% chlorine. As in Cases A, B, and C, 1.8 mole-% of chlorine is equivalent to a 100 torr chlorine partial pressure at adsorption conditions. Case E, wherein 5 percent of the silica gel of Case D was replaced with silicalite as a second adsorption layer in each of the adsorption beds showed a 2 percent feed capacity advantage and a 3 percent diluent rejection advantage over Case D. Case F, wherein 25 percent of the silica gel of Case D was replaced with silicate as a second adsorption layer, showed a 23 percent feed capacity advantage over Case D and in addition showed a 30 percent increase in the rejection of the diluent with the vent gas.

Cases G and H were based on the same feed composition as Cases D, E and F, and were directed to producing a vent gas with a 10 torr chlorine partial pressure, or a 0.2 mole-% chlorine content in the vent gas at adsorption conditions. Case G represents an all silica gel operation and Case H represents the use of a second adsorbent layer containing a strong adsorbent, silicalite, equal to 25 percent of the total adsorbent bed. Case H showed a 32 percent capacity advantage over Case G while achieving the same level of chlorine remediation in the vent gas. In addition Case H showed that the rejection of the diluent achieved a four-fold increase over Case G.

Thus, in a process for the remediation of a chlorine plant offgas and for the recovery of a liquid chlorine product, the replacement of at least a portion of the adsorbent bed with a second layer comprising a strong absorbent resulted in significant capacity improvements related to increased feedstock capacity, or a corresponding decrease in the amount of the adsorbent required for the separation. Furthermore, the increased rejection of diluent with the vent gas provides the additional advantage of reduced recycle rates in the process of the present invention.

We claim:

1. A pressure swing adsorption process for the recovery and removal of chlorine from a chlorine plant offgas stream comprising hydrogen, air, and chlorine, said process comprising:

a) passing said chlorine plant offgas stream at adsorption conditions including an adsorption temperature and an adsorption pressure to a pressure swing adsorption (PSA) zone, said pressure swing adsorption zone comprising a first adsorption bed of at least two adsorption beds each of said adsorption beds having a first adsorbent layer containing a weak adsorbent selective for the adsorption of chlorine and a second adsorbent layer containing a strong adsorbent selective for the adsorption of chlorine to provide a vent gas stream withdrawn at a pressure substantially equal to said adsorption pressure said vent gas stream being substantially free of chlorine, and a tail gas stream withdrawn at a desorption pressure, said tail gas stream comprising chlorine; and b) compressing said tail gas stream to provide a compressed tail gas stream and condensing said compressed tail gas stream to provide a liquefied chlorine product and a reduced chlorine offgas stream.

2. The process of claim 1, wherein said weak adsorbent comprises zeolites having a large pore structure with 12 member rings or more, said weak adsorbent including Zeolite X, Zeolite Y, Zeolite LZ-10, Zeolite LZ-15, Zeolite LZ-20, Boggsite, hexagonal Faujasite, and Zeolite Beta.

3. The process of claim 1, wherein said weak adsorbent is selected from the group consisting of silica gel, zeolite LZ-10, zeolite LZ-15, zeolite LZ-20, and mixtures thereof.

4. The process of claim 1, wherein said strong adsorbent comprises zeolites having a small pore structure, said strong adsorbent including Zeolite L, Mordenite, Zeolite Omega, ZSM-5, ZSM-11, ZSM-12, ZSM-18, ferrierite, clinoptilolite, chabazite, erionite, Zeolite A, Zeolite-rho, and silicalite.

5. The process of claim 1, wherein said strong adsorbent is selected from the group consisting of silicalite, acid washed clinoptilolite, ammonia clinoptilolite, and mixtures thereof.

6. The process of claim 1 wherein said first adsorbent layer comprises up to about 95 percent of each of said adsorbent beds.

7. The process of claim 1 wherein said second adsorbent layer comprises from about 5 to about 25 percent of each of said adsorbent beds.

8. The process claim 1 wherein the adsorption temperature in said PSA zone ranges from about $-40°$ C. to about $40°$ C. (about $-40°$ F. to about $100°$ F.).

9. The process of claim 1 wherein the adsorption pressure ranges from about 345 kPa to about 4.1 MPa (about 50 psia to about 600 psia) and the desorption pressure range from about 100 kPa to about 210 kPa (about 15 psia to about 30 psia).

10. The process of claim 1 further comprising the admixing of a diluent stream with said chlorine plant offgas stream before passing said chlorine plant offgas stream to said pressure swing adsorption zone.

11. The process of claim 10 wherein the diluent stream is selected from the group consisting of air, nitrogen and mixtures thereof.

12. The process of claim 10 wherein at least a portion of said diluent is rejected with the vent gas.

13. The process of claim 1 wherein said vent gas stream being substantially free of chlorine contains between 0.1 and 1.0 ppm wt of chlorine.

14. The process of claim 1 wherein said vent gas stream comprises less than about 4 mol-% hydrogen.

15. A pressure swing adsorption process for the recovery and removal of chlorine from a chlorine plant offgas stream comprising hydrogen, air, and chlorine, said process comprising:

a) passing said chlorine plant offgas stream at a chlorine plant pressure to a first compressor to raise said pressure to a first condensation pressure and provide a compressed chlorine plant offgas stream;

b) cooling and condensing said compressed chlorine plant offgas stream to provide a first liquid chlorine product stream and a first reduced chlorine offgas stream comprising hydrogen and having a concentration of chlorine which is lower than that of said chlorine plant offgas stream;

c) passing said first reduced chlorine offgas stream to a pressure swing adsorption zone at adsorption conditions including an adsorption pressure, said pressure swing adsorption zone comprising a first adsorption bed of at least two adsorption beds each of said adsorption beds having a first adsorbent layer containing a weak adsorbent selective for the adsorption of chlorine and at least a second adsorbent layer containing a strong adsorbent selective for the adsorption of chlorine to provide a vent gas stream comprising hydrogen and a tail gas stream comprising chlorine;

d) compressing, cooling, and condensing said tail gas stream to provide a second liquid chlorine product stream and a second reduced chlorine offgas stream; and, e) passing said second reduced chlorine offgas stream to said pressure swing adsorption zone to be admixed with said chlorine plant offgas stream.

16. The process of claim 15 further comprising recovering said first and second liquid chlorine product streams as a combined liquid chlorine product.

17. The process of claim 16 further comprising passing the combined liquid chlorine product to a chlorine plant.

18. The process claim 15 wherein the first reduced chlorine offgas stream comprises less than about 4 mol-% hydrogen.

19. The process of claim 15 wherein the chlorine entering the second adsorption layer is less than about 10 vol-% chlorine.

20. The process of claim 15 wherein the chlorine entering the second adsorption layer is less than about 2 vol-% chlorine.

* * * * *